Figure 1:
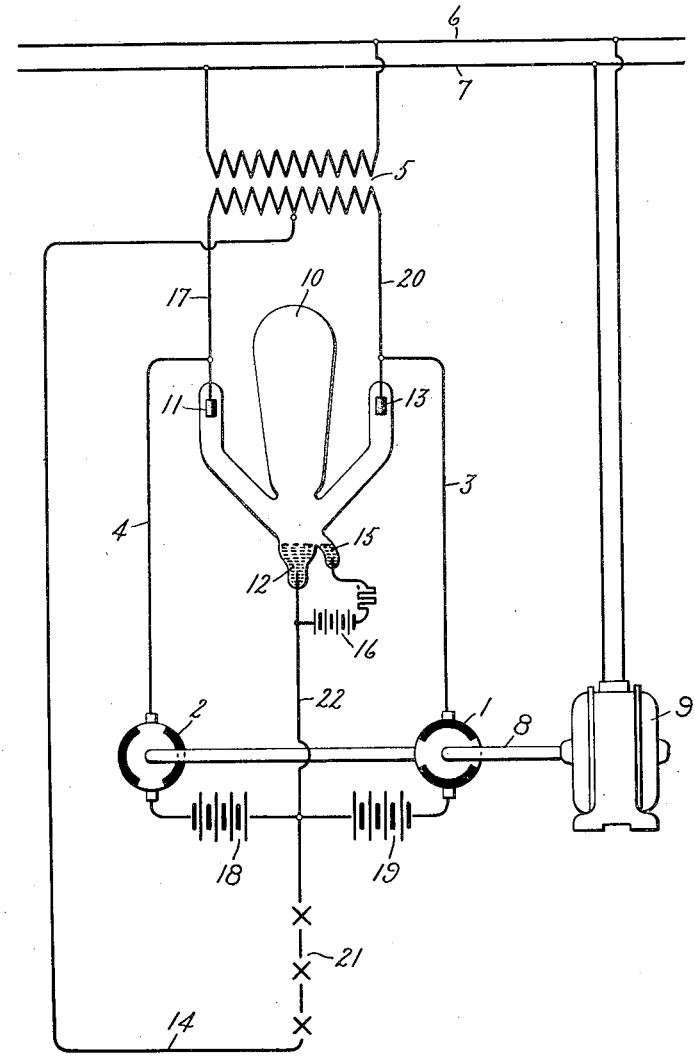

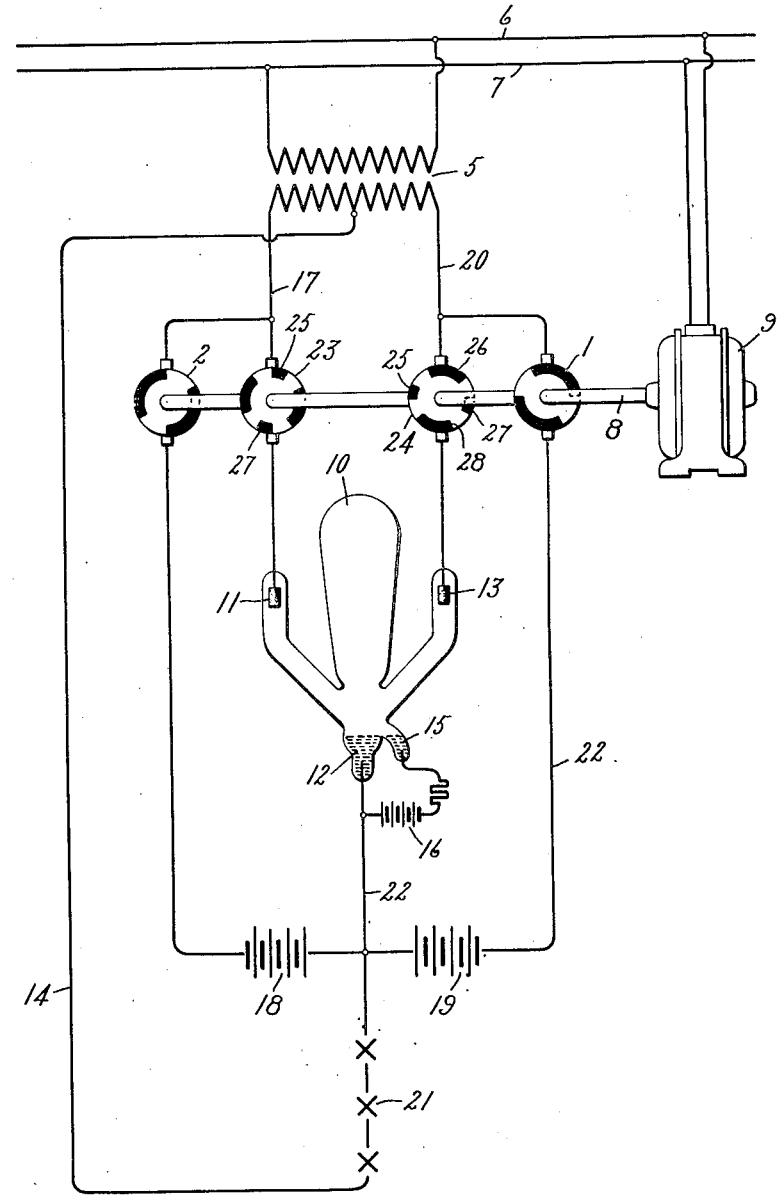

UNITED STATES PATENT OFFICE.

FRED W. LYLE, OF LYNN, MASSACHUSETTS, ASSIGNOR TO GENERAL ELECTRIC COMPANY, A CORPORATION OF NEW YORK.

RECTIFYING DEVICE.

1,185,419.  Specification of Letters Patent.  Patented May 30, 1916.

Application filed February 14, 1912. Serial No. 677,608.

*To all whom it may concern:*

Be it known that I, FRED W. LYLE, a citizen of the United States, residing at Lynn, in the county of Essex, State of Massachusetts, have invented certain new and useful Improvements in Rectifying Devices, of which the following is a specification.

My invention relates to the rectification of alternating current and comprises a system using an arc or other asymmetric rectifying device in conjunction with a synchronous mechanical rectifier for the purpose of efficiently rectifying heavy currents.

Up to the present time it has been found very difficult to continuously rectify large amounts of electrical power. Mechanical rectifiers are subject to destructive arcing because of the impossibility of always commutating the current at the precise instant when the electromotive force is zero. I have found that this difficulty may be overcome by combining with the commutating rectifier, an asymmetric device, such as a mercury arc, or other suitable device having unidirectional conductivity.

In accordance with my invention the asymmetric rectifying device, such as a mercury vapor arc, is operated in conjunction with a synchronous mechanical rectifier, or commutator, in such a manner that a certain part or fraction of the alternating current wave near the minimum point is carried, say, by the arc rectifier and the rest of the wave displaced from zero is carried by the mechanical rectifier.

Of the accompanying drawings, Figure 1 is a diagram illustrating my invention and Fig. 2 is a modification.

As shown in Fig. 1, the rotating commutators 1, 2 are connected by means of conductors 3, 4 to the secondary of a transformer 5, the primary of which is in turn connected to a supply circuit represented by wires 6, 7. The commutators 1, 2 are mounted upon a shaft 8 which is driven by a synchronous motor 9 of the four-pole type. The motor is conveniently connected to the supply wires 6, 7 in order to operate in synchronism with the alternating current to be rectified. The path through the rectifier 10, here illustrated as a mercury vapor rectifier, between anode 11 and cathode 12 is in shunt with the commutator 2 and the path from the anode 13 to the cathode 12 is in shunt with the commutator 1. The cathode 12 and commutator 1 and 2 are connected to a common return supply conductor 14 acting as a distributing circuit for the load 21 and which is connected to a neutral or intermediate point of the secondary of the transformer 5. The rectifier 10 is continually maintained in a conductive condition by a side branch arc running from the auxiliary anode 15 to the cathode 12 and conveniently maintained by storage battery 16 or in any other well known way.

The commutators 1 and 2 each consist of conductive and insulating segments angularly displaced with respect to each other so that they alternately carry current. The insulating segments indicated in black comprise more than 180° and are so placed that during a short interval before and after the instant the current to be rectified passes through zero both commutators are open-circuited. The length of the total period during which both commutators are open-circuited should be at least equal to the angular variation from synchronism of the motor driving the commutators. During the interval of open-circuit, the mercury rectifier carries the current as will be described.

Suppose the polarity of the alternating voltage to be such, for example, as to make the electrode 11 positive and the voltage value to be near its maximum, the flow of current will take place through conductors 17 and 4 and the commutator 2 instead of through the rectifier, as the commutator affords a path of lower resistance than the rectifier. When the voltage approaches the zero value, the circuit through the commutator is opened and the current automatically shifts through the rectifier path by the establishment of an arc between the anode 11 and the cathode 12. This shunting of the commutator by the mercury arc rectifier greatly subdues the arcing of the commutator. However, the resistance of the arc rectifier is of such magnitude that arcing at the brushes of the mechanical rectifier is not completely avoided, for, to maintain current flow through the vapor path, a certain electromotive force is necessary which, if the commutator simply shunts the arc rectifier, will cause some sparking at the brushes. To compensate for this counter-electromotive force of the arc, sources of electromotive force 18 and 19, one in each commutator circuit, are inserted. These may consist of a battery of iron plates placed in a solution of potassium hydroxid, or of an ordinary storage battery, or other known appropriate means. The electromotive force of this battery should be nearly equal to the counter-electromotive force of the arc path which is virtually constant at all currents. By this means the arcing at the commutator is suppressed to practically the same extent as in ordinary direct current machinery.

As the voltage passes through zero and reverses, the current shifts automatically to the anode 13. Soon after the reversal of the voltage, the commutator 1 closes its circuit and thereby affords a lower resistance path to the current which causes the mercury arc to go out, the current passing from conductor 20, to conductor 3, the commutator 1 and to conductor 14. When the circuit is again interrupted as the voltage approaches zero value, the mercury arc is reëstablished, and upon the reversal of polarity shifts to the other arm of the rectifier, where the cycle is repeated. It will thus be seen that both the mechanical commutator and the mercury arc rectifier contribute current to the load circuit 14 in which are located translating devices 21. As the current is carried by the mechanical rectifier 1, 2 during the greater part of each half cycle and also during the interval of maximum value, only a small part of the load is actually assumed by the mercury arc rectifier. Consequently very large currents can be rectified by this arrangement, as the maximum current carrying capacity of the rectifier need not be larger than the average of these small fractions of the load.

To show what power can be delivered in practice by an apparatus of this type, there may be assumed a motor having a maximum deviation of 20 degrees from exact synchronism with the line voltage, a mercury arc device capable of carrying an average current of 50 amperes at 500 volts, and a mechanical rectifier of sufficient brush area. With such a system, the commutator would have to carry no current during 20 degrees out of each half cycle; thus, during one-ninth of the time, the mercury arc would carry the load current. It being assumed that the current in the mercury arc rectifier can have an average value of 50 amperes, the load current may be at least nine times this or 450 amperes which could readily be handled by the mechanical rectifier. At 500 volts, this would give with each mercury arc tube used 225 kilowatts. If a number of mercury arc tubes are operated in multiple or a mercury arc rectifier of larger capacity is used, the power derived from the apparatus is correspondingly increased.

In the system illustrated by Fig. 2, each anode lead of the rectifier is provided with a circuit-opening device operating to synchronously open the anode circuit for an interval prior to the time the commutator connected to the opposite side of the transformer closes its circuit. The reason for this provision is to prevent a short-circuit across the source of power, in case the synchronous motor should get sufficiently out of phase as not to open either mechanical commutator until after the voltage has reversed. For example, referring to Fig. 1, if commutator 1 were to maintain its circuit after the anode 11 has become positive, then a short-circuit would take place through conductor 17, the rectifier, conductor 22, commutator 1 and conductors 3 and 20. This possibility is prevented by placing a commutator 23 in conductor 17 which opens the circuit before the commutator 1 closes its circuit and only closes again after 1 has opened. Similarly, a commutator 24 in the anode lead 20 opens the circuit of anode 13 a considerable time before the commutator 2 begins to carry current and only closes again after 2 has opened.

It is not necessary that the commutator 23 close its circuit before the line voltage becomes positive from 11 to 12, as the inductance inherent in all commercial circuits will keep the arc running from the anode 13, even after the conductor 20 has become negative to the conductor 17, until a path is provided, by the closure of the commutator 23, for current flow from the anode 11. The same conditions apply to the commutator 24.

The commutator of the mechanical rectifier in the arrangement shown in Fig. 2 is provided with four insulating segments 25, 26, 27 and 28. The segments 25 and 27 are inserted to open the mercury arc circuit when the circuit of the commutator in shunt therewith is closed to insure an interruption of the mercury arc. They may be omitted, of course, when the resistance of the arc-shunting commutator circuit is made sufficiently low to put out the arc, as described in connection with Fig. 1. It will be observed that the synchronously operated commutators 23 and 24 with their insulating segments 26 and 28 not only prevent short circuits across the source of power through the mechanical rectifiers as above explained, but also by connecting and disconnecting the rectifier anodes alternately to and from the supply circuits, the prohibitive resistance to current flow thus provided, prevents injurious internal arcing between the anodes in the rectifier. Each anode circuit is disconnected from the supply circuit for a certain interval when the supply potential is negative. Each of these commutators is provided with solid conductive segments properly connected and occupying the space indicated in ground color and of insulating segments indicated in ink. The commutators may be conveniently made up of ordinary commutator bars insulated by mica from the solid segments and from each other.

The particular system described above is designed for operation with a four-pole synchronous motor which revolves one-half a turn per cycle. Therefore, 180° on the commutator corresponds with 360° of the voltage cycle. When using a motor having a different number of poles, the angular relation of the segments should correspond with the number of revolutions per cycle made by the motor.

What I claim as new, and desire to secure by Letters Patent of the United States, is:—

1. The combination of a source of alternating current, a load circuit, an asymmetric rectifier having its terminals connected respectively to said source and said load circuit, and a synchronous mechanical rectifier connected to the terminals of said rectifier and having conductive segments proportioned to carry current during wave fractions of the alternating source displaced from zero.

2. The combination of a source of alternating current, a synchronous mechanical rectifying device connected thereto, and an arc rectifying device coacting therewith to carry the current as it changes in direction, to the exclusion of the mechanical rectifying device.

3. The combination of a circuit carrying an alternating current, a load circuit, mechanical switching means for delivering impulses of said alternating current to the load circuit as direct current during a part of the half cycle intervals, and an asymmetric rectifying device connected to opposite poles of said switching means for delivering the remainder of the half cycle intervals when said switching means is open-circuited.

4. The combination of a circuit carrying an alternating current, an external circuit, a commutator rotating in synchronism with the alternations of said current for delivering a portion of the impulses to said external circuit as direct current, and an arc rectifying device connected to terminals of said commutator for rectifying the alternating current while the commutator circuit is open.

5. The combination of a circuit carrying an alternating current, an external direct current consumption circuit, switching means for delivering fractions of the waves of the alternating current near their maximum value to the external circuit as unidirectional current, and a mercury arc device having anodes connected to the alternating current circuit, and its cathode to the direct current circuit for delivering fractions of the alternating current waves near their zero value to the external circuit as direct current.

6. The combination of a source of alternating current, a load circuit, paired commutating devices electrically connected thereto for delivering a portion of the alternating current waves near their maximum value to the load circuit as unidirectional current, a mercury arc rectifier having its anodes connected to the source of alternating current and its cathode to the load circuit for delivering the remainder of the waves as unidirectional current, and a connection for said load circuit to a neutral point on said alternating current source.

7. The combination of a source of alternating current, an external circuit, synchronous commutators, connected to said source, to deliver a portion of the waves of the alternating current to the external circuit as direct current, an asymmetric stationary rectifying device electrically connected with said commutator for delivering the remainder of the waves as direct current, and means for disconnecting said stationary rectifying device from one pole of the source during the interval that a commutator connected to the opposite pole has closed its circuit.

8. The combination of a source of alternating current, an external circuit, a mechanical rectifying device connected to said source to deliver fractions of the alternating current waves to the external circuit, a vapor rectifying device electrically connected to said device to carry current near the zero point of the waves, a source of counter-electromotive force in series with said mechanical device to compensate for the voltage drop in the vapor device, and means for opening the circuit of the vapor device in synchronism with the closure of the circuit of the mechanical device.

9. A system of distribution comprising a supply circuit, a transformer associated therewith, a rectifier having its anodes connected to the transformer, a commutator included in the connections between the transformer and the anodes of the rectifier, and a distributing circuit connected to the cathode of the rectifier and an intermediate point of the transformer.

10. A system of distribution comprising a supply circuit, a transformer connected thereto, a rectifier having its anodes connected to the transformer, a synchronously operated commutator included in the connections between the transformer and the rectifier, and a distributing circuit connected to the cathode of the rectifier and an intermediate point of the transformer.

11. The combination of a source of alternating current, a vapor electric rectifier, connections for the anodes and the cathode of said rectifier to said source and a synchronously driven mechanical commutator disconnecting the anodes in turn from their supply terminals when said anodes respectively become negative and reëstablishing the connection before they respectively become positive.

12. The combination of a source of alternating current, a mercury vapor device having a mercury cathode and a plurality of connecting anodes, connections from said source to said electrodes and means operating synchronously with reversal of said source for mechanically opening the anode circuits when said anodes respectively become negative and closing the circuit before the potential reverses.

13. In a rectifying apparatus, the combination of a circuit for unidirectional current-impulses, means to open and close the circuit periodically, an asymmetrical current-passing device in parallel with said means, and means for connecting the circuit with a source of alternating current.

14. A system of distribution comprising a supply circuit, a distributing circuit, a rectifier having two anodes interposed between said circuits, and means for establishing a solid metallic conducting connection between said supply circuit and each anode alternately and completely severing said connection to one anode while the other anode is solidly connected to the supply circuit.

15. A system of distribution comprising a supply circuit, a distributing circuit, a rectifier having two anodes interposed between the said circuits, and synchronously operated switching means for mechanically closing and mechanically opening solid metallic connections between said supply circuit and said anodes to solidly connect and completely disconnect said anodes alternately to and from the supply circuit.

16. The combination of a source of alternating current, a rectifier, connections from said source to an anode and cathode of said rectifier and mechanically actuated means for increasing the resistance of the external anode circuit to electrical discharges through said circuit in both directions during an interval when said anode is of negative potential.

In witness whereof, I have hereunto set my hand this twelfth day of February, 1912.

FRED W. LYLE.

Witnesses:
JOHN A. MCMANUS, Jr.,
FRANK G. HATTIE.